INVENTOR.
Robert I. Homier &
Raymond C. Posh

INVENTOR.
Robert I. Homier &
Raymond C. Posh
ATTORNEYS

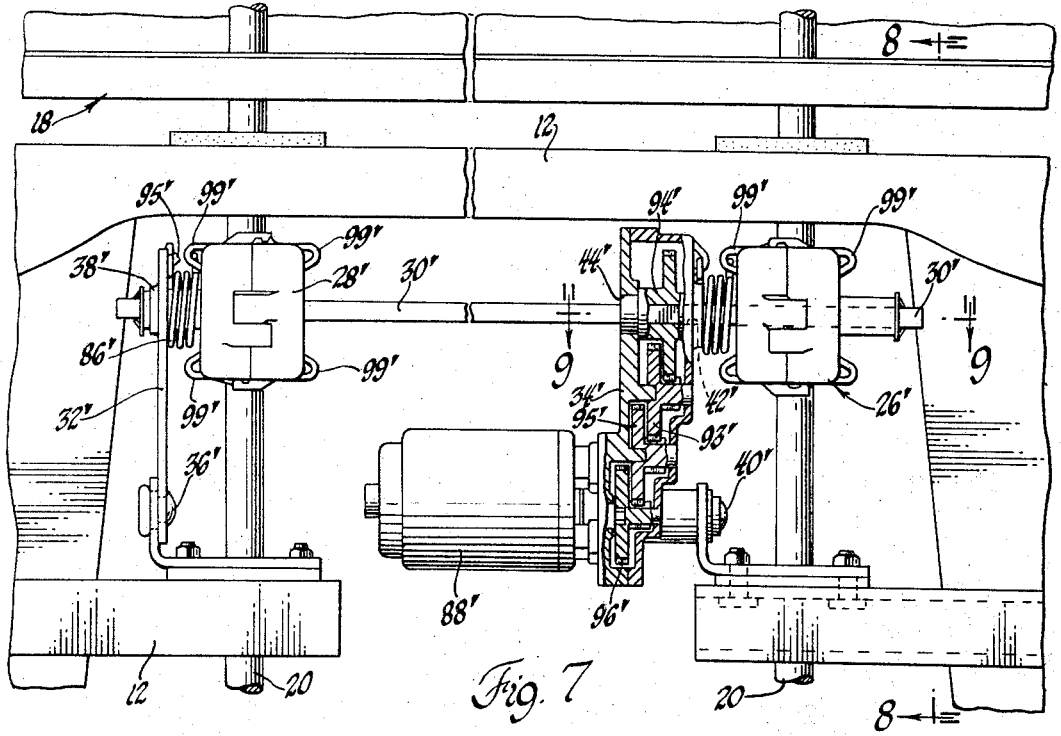
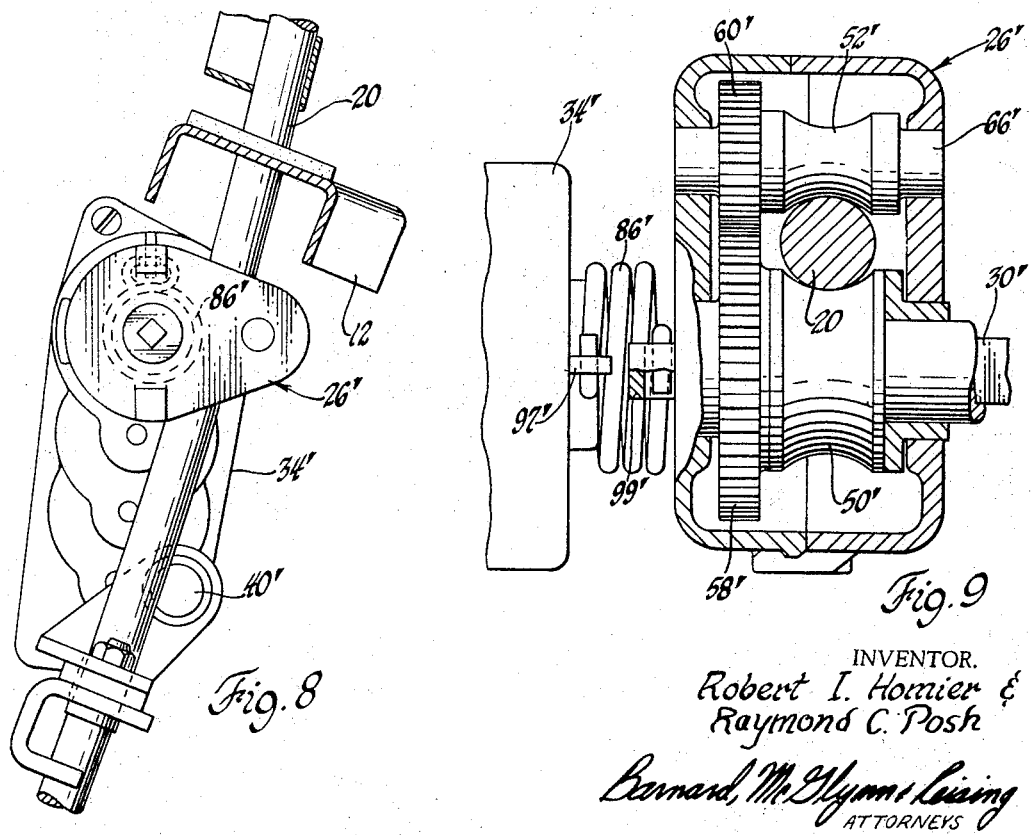

United States Patent Office 3,345,107
Patented Oct. 3, 1967

3,345,107
HEADREST ACTUATOR
Robert I. Homier, Farmington, and Raymond C. Posh, Livonia, Mich., assignors, by mesne assignments, to Lear Siegler, Inc., Santa Monica, Calif., a corporation of Delaware
Filed May 13, 1966, Ser. No. 550,051
10 Claims. (Cl. 297—410)

This invention relates to a seat assembly including a seat frame with an adjustable headrest disposed on the back of the frame and, more specifically, to an improved actuator for adjusting the position of the headrest relative to the seat frame.

Adjustable headrest assemblies of the instant type normally include a pair of rods or bars which are connected to the headrest and are slidably disposed in the back of the seat frame. It is often difficult to provide an actuating mechanism to engage the bars because of the lack of space in the back of the seat frame for disposing the actuating mechanism to adjust the position of the headrest. Furthermore, the back of such seat frames are normally enclosed and the actuating mechanism utilized to coact with the bars to adjust the position of the headrest should be maintenance-free and free from excessive wear because of the lack of access to the mechanism.

Accordingly, it is an object and feature of this invention to provide a novel headrest actuator which may be enclosed in the back of a seat frame and which is long wearing and free of maintenance.

Another object and feature of this invention is to provide a seat assembly including a frame with an adjustable headrest having support means slidably disposed in the frame and a pair of spaced wheels rotatably supported by housing means for frictionally engaging opposite sides of the support means for adjusting the vertical position of the headrest.

In general, these and other objects and features of this invention may be attained in a preferred embodiment including a frame, an adjustable headrest, and a pair of spaced bars attached to the headrest and slidably supported in the frame. A gear casing is pivotally connected to the frame and rotatably supports the shaft, and a support member is pivotally connected to the frame in spaced relation to the casing for also rotatably supporting the shaft. A first housing is rotatably journalled on the shaft adjacent the casing and a second housing is rotatably journalled on the shaft adjacent the support member. A pair of spaced wheels are rotatably supported in each housing and engage opposite sides of one of the bars whereby upon rotation of the wheels the bars are moved to adjust the position of the headrest. There is also included drive means for rotating the shaft which in turn rotates one of the wheels of each pair and a pair of gears drivingly connect the shaft to the other wheel of each pair so that each pair of wheels are rotated in unison upon rotation of the shaft. A spring is associated with each housing and urges each housing to rotate about the shaft for urging the wheels in each housing to frictionally drivingly engage the associtaed bar.

Other objects and attendant advantages of the present invention will be readily appreciated as the same becomes better understood by reference to the following detailed description when considered in connection with the accompanying drawings wherein:

FIGURE 7 is an enlarged fragmentary view partially broken away of an alternative embodiment of the instant invention;

FIGURE 8 is an enlarged fragmentary cross-sectional view taken substantially along the line 8—8 of FIGURE 7; and FIGURE 9 is an enlarged fragmentary cross-sectional view taken substantially along line 9—9 of FIGURE 7.

Figure 1:
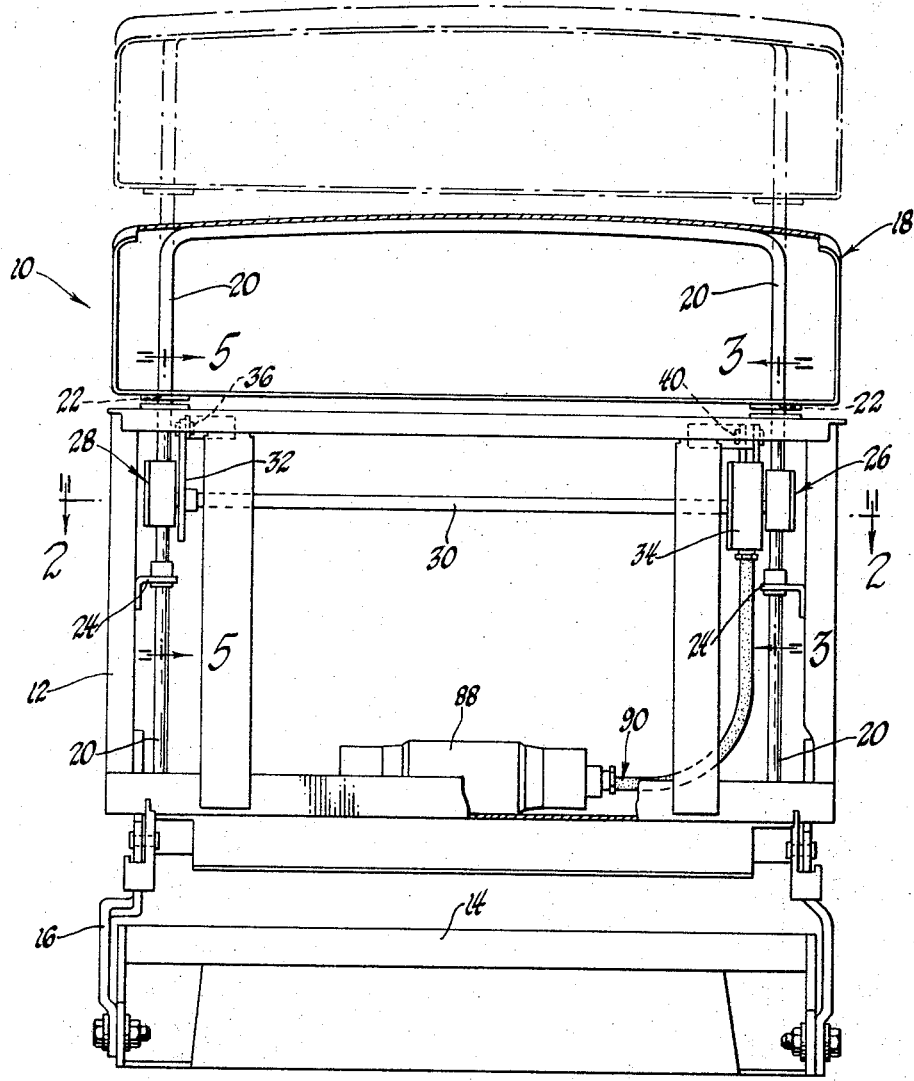
FIGURE 1 is a front elevational view of a preferred embodiment of the seat assembly of the instant invention and shows the headrest in a raised position in phantom.
Figure 2:
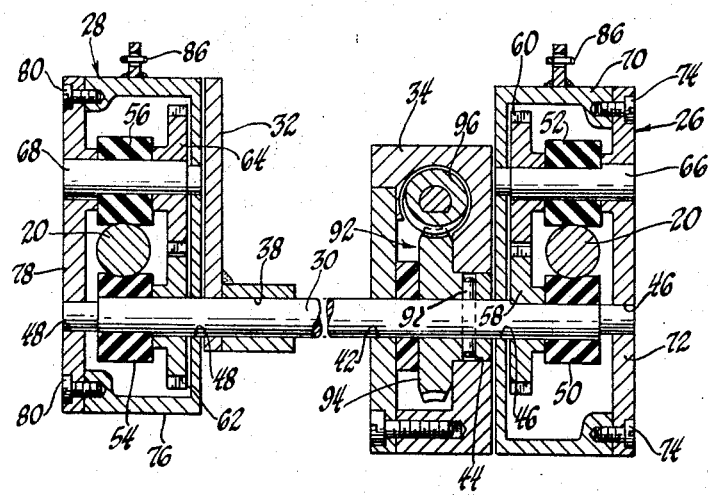
FIGURE 2 is an enlarged fragmentary cross-sectional view taken substantially along line 2—2 of FIGURE 1.

Referring now to the drawings wherein like numerals indicate like or corresponding parts throughout the several views, a preferred embodiment of the seat assembly of the instant invention is generally shown at 10 in FIGURES 1 through 6. The seat assembly 10 includes a back frame 12, a seat frame 14 and interconnecting links 16 which allow the back frame 12 to pivot relative to the seat frame 14. The seat assembly also includes an adjustable headrest generally indicated at 18.

The bars 20 comprise a support means and depend from the headrest 18 and are operatively connected to the frame 12 for allowing the headrest to move vertically relative to the frame 12. The bars 20 are spaced apart and are slidably disposed in the top portion of the frame 12, as indicated at 22, and in the brackets 24 of the frame 12. As illustrated, the bars 20 are the legs of an integral U-shaped member; however, it will be understood and clear to those of ordinary skill in the art that the bars 20 may be independent of one another. It will also be noted that the bars 20 are curved to correspond with the curvature of the back frame 12 which is normally curved for forming the contour of the seat.

A first housing means, generally indicated at 26, is operatively connected to the frame 12 adjacent one of the bars 20 and a second housing means, generally shown at 28, is operatively connected to the frame 12 adjacent the other bar 20. The first and second housing means 26 and 28 are operatively connected to the frame 12 by the shaft 30 and the bracket means comprising the member 32 and the casing 34. The member 32 is pivotally connected to the frame 12 at 36 and rotatably supports the shaft 30 at 38 adjacent the second housing means 28. The casing 34 is pivotally connected to the frame 12 at 40 and rotatably supports the shaft 30, as indicated at 42 and 44. The shaft 30 is rotatably journalled in the housing means 26, as indicated at 46, and is rotatably journalled in the second housing means as indicated at 48.

Figure 3:
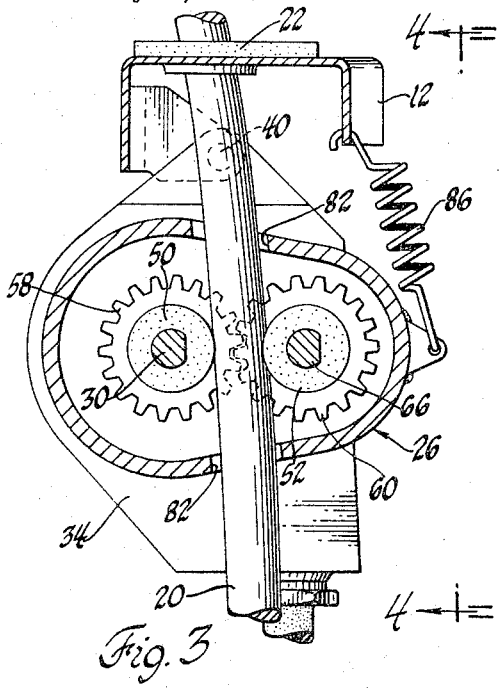
FIGURE 3 is an enlarged fragmentary cross-sectional view taken substantially along line 3—3 of FIGURE 1.
Figure 4:
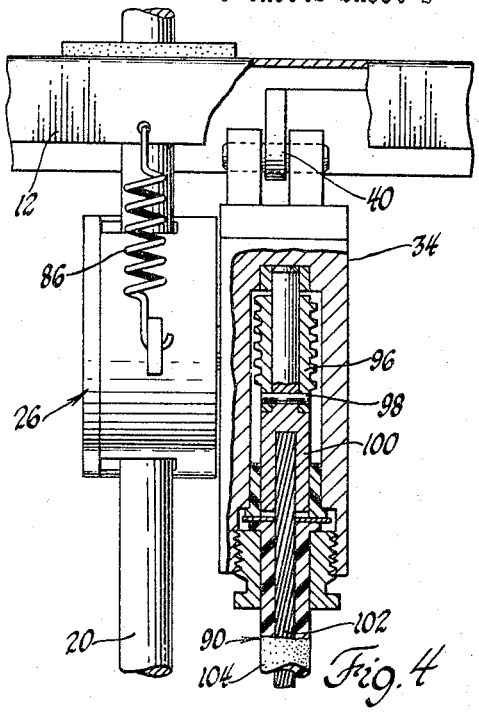
FIGURE 4 is a fragmentary view partially broken away and taken substantially along line 4—4 of FIGURE 3.
Figure 5:
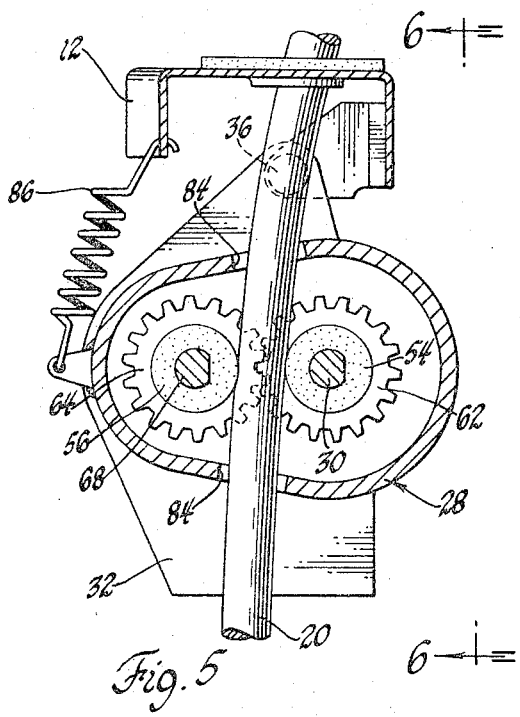
FIGURE 5 is an enlarged fragmentary cross-sectional view taken substantially along line 5—5 of FIGURE 1.
Figure 6:
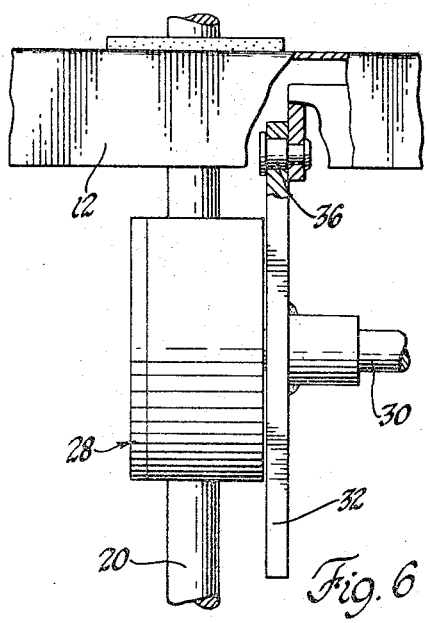
FIGURE 6 is a fragmentary view partially broken away and taken substantially along line 6—6 of FIGURE 5.

A pair of spaced wheels 50 and 52 are rotatably supported by the first housing means 26 for frictionally engaging opposite sides of one of the bars 20 and a second pair of wheels 54 and 56 are rotatably supported by the second housing means 28 for frictionally engaging opposite sides of the other bar 20. Wheels 50 and 54 of each pair are disposed on the shaft 30 to be driven thereby. That is, the shaft 30 is D-shaped, as indicated in FIGURES 3 and 5, and the wheels 50 and 54 have mating bores therethrough so that upon rotation of the shaft 30 the wheels 50 and 54 are rotated.

There is also included means comprising the gears 58, 60, 62 and 64, and the stub shafts 66 and 68 for operatively interconnecting the shaft 30 and the other wheels 52 and 56 of each pair for driving the wheels 52 and 56 in unison with the wheels 50 and 54. The wheels 52 and 56 are disposed on the respective stub shafts 66 and 68 and each of the stub shafts 66 and 68 are journalled for rotation in the respective housing means 26 and 28. The gear 58 is disposed on the shaft 30 to be driven thereby and drivingly engages the gear 60 for rotating the stub shaft 66. Likewise, the gear 62 is secured on the shaft 30 for rotation therewith and drivingly engages the gear 64 for rotating the stub shaft 68. Therefore, upon rotation of the shaft 30, the wheels 50, 52, 54 and 56 are rotated in unison and frictionally and drivingly engage opposite sides of the bars 20 to move the bars and, hence, adjust the position of the headrest 18.

The first housing means 26 includes a cup-shaped member 70 and a cap 72 held in position by the screws 74. Likewise the second housing means 28 includes a cup-shaped member 76 and cap 78 held in position by the screws 80. The respective housing means 26 and 28 have openings 82 and 84 through which the bars 20 extend.

There is also included biasing means urging the respective housing means 26 and 28 to rotate for urging the wheels 50, 52, 54 and 56 into frictional driving engagement with the bars 20. More specifically, the biasing means includes a pair of springs 86, each of which interconnects one of the housing means and the frame 12, which is best shown in FIGURES 3 and 5. Since each of the housing means 26 and 28 is journalled on the shaft 30, as indicated at 46 and 48 respectively, the housing means 26 and 28 are free to rotate about the axis of the shaft 30. Hence, the springs 86 urge the housing means 26 and 28 to rotate about the axis of the shaft 30 to urge the respective wheels 50, 52, 54 and 56 into frictional driving engagement with the respective bars 20.

Drive means, comprising the motor 88, the motion transmitting assembly 90 and the casing 34 which houses the gear means generally indicated at 92, are included to rotate the wheels 50, 52, 54 and 56 to adjust the position of the headrest relative to the frame 12. More specifically, the casing 34 rotatably supports the gear 94 which is keyed to the shaft 30 by the pin 91. The gear 94 is rotatably supported at 44 and, hence, the shaft 30 is rotatably supported at 44, as hereinbefore mentioned. The casing 34 also rotatably supports the gear 96 which is connected through a pin 98 and a fitting 100 to a motion transmitting core element 102. The core element 102 is rotatably disposed in the conduit 104 and the core element 102 and conduit 104 comprise the motion transmitting assembly 90. The other end of the core element 102 is operatively connected to the motor 88 so that upon rotation of the motor 88 the core element 102 rotates to rotate the gear 96 which in turn rotates gear 94, hence rotating the shaft 30 and the wheels 50, 52, 54 and 56.

Referring now to FIGURES 7 through 9 there is shown an alternative preferred embodiment of the instant invention. A member 32' is pivotally connected to the frame 12 as indicated at 36' and rotatably supports the shaft 30', as indicated at 38'. A casing 34' is pivotally connected to the frame 12, as indicated at 40' and rotatably supports the shaft 30', as indicated at 42' and 44'. The casing 34' rotatably supports the gears 94', 93', 95' and 96', the gear 96' being driven by the motor 88'.

There is also included a first housing means 26' and a second housing means 28', each of which is rotatably supported on the shaft 30'. Each housing means 26' and 28' rotatably supports a pair of wheels for frictionally drivingly engaging opposite sides of the bars 20. Housing means 26' rotatably supports wheels 50' and 52' as shown in FIGURE 9. The wheels associated with the housing means 26' and 28' are grooved as illustrated by the wheels 50' and 52'. The wheels 50' is supported on the stub shaft 66' as is the gear 60' which in turn is in driven engagement with the gear 58' so that upon rotation of the shaft 30' the wheels 50' and 52' are driven in unison, as are the wheels in housing means 28'.

Each of the housing means 26' and 28' has a plurality of loops 99' disposed thereabout. The casing 34' also has a loop 97' and the member 32' has a finger 95'. There is included biasing means comprising the springs 86' each of which is disposed about the shaft 30'. One of the springs 86' is disposed about the shaft 30' and interconnects the casing 34' and the first housing means 26' by engaging a loop 99' on the housing 26' and the loop 97' on the casing 34' for urging the first housing means 26' to rotate about the shaft 30'. The other spring 86' is also disposed about the shaft 30' and interconnects the member 32' and the second housing means 28' in a like manner for urging the second housing means 28' to rotate about the shaft 30'. Thus, the wheels associated with the respective housing means 26' and 28' of the embodiment illustrated in FIGURES 7 through 9 are urged into frictional driving engagement with the bars 20 by the springs 86'.

As illustrated in FIGURE 9, the wheels 50' and 52' are of different diameters; hence, the gears 58' and 60' must be of diameters such that there is no sliding or slipping movement between the bars 20 and the respective wheels 50' and 52'.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiment of the invention in which an exclusive property or privilege is claimed is defined as follows:

1. A seat assembly comprising; a frame, an adjustable headrest, support means depending from said headrest and operatively connected to said frame for allowing said headrest to move relative to said frame, housing means operatively connected to said frame, a pair of spaced wheels rotatably supported by said housing means for frictionally engaging opposite sides of said support means, and drive means operatively connected to said wheels for rotating said wheels to move said support means relative to said frame to adjust position of said headrest.

2. A seat assembly as set forth in claim 1 wherein said housing means is operatively connected to said frame for rotational movement relative thereto, and including biasing means urging said housing means to rotate for urging said wheels into frictional driving engagement with support means.

3. A seat assembly as set forth in claim 1 wherein said support means includes a pair of spaced bars slidably disposed in said frame, and including first and second of said housing means with each of said first and second housing means operatively connected to said frame adjacent one of said bars, each of said housing means having a pair of said spaced wheels rotatably supported thereby, one of said pair of spaced wheels frictionally engaging opposite sides of one of said bars and the other of said pair of spaced wheels frictionally engaging opposite sides of the other of said bars.

4. A seat assembly as set forth in claim 3 wherein said first and second housing means are operatively connected to said frame by a shaft which is rotatably journalled in each of said housing means and bracket means pivotally connected to said frame and rotatably supporting said shaft.

5. A seat assembly as set forth in claim 4 wherein one wheel of each of said pair of spaced wheels is disposed on said shaft and is driven thereby, and means operatively interconnecting said shaft and the other wheel of each of said pair of spaced wheels for driving said other wheels.

6. A seat assembly as set forth in claim 5 including biasing means urging each of said housing means to rotate about said shaft for urging each of said pair of spaced wheels into frictional driving engagement with said respective bars.

7. A seat assembly as set forth in claim 6 wherein said other wheel of each pair of spaced wheels is disposed on a stub shaft, each of said stub shafts being journalled in one of said housing means, said means operatively interconnecting said shaft and said other wheels comprising a pair of gears associated with each of said housing means with one gear of each pair disposed on said shaft and drivingly engaging the other gear of each pair which is disposed on one of said stub shafts whereby said other wheels are driven through said gears and said stub shafts upon rotation of said shaft.

8. A seat assembly as set forth in claim 7 wherein said drive means includes gear means for rotating said shaft, said bracket means including a casing for said gear means and disposed adjacent said first housing means, said shaft being rotatably supported in said casing, said casing being pivotally connected to said frame, said bracket means also including a member pivotally connected to said frame and rotatably supporting said shaft adjacent said second housing means.

9. A seat assembly as set forth in claim 8 wherein said biasing means includes a pair of springs, each of said prings interconnecting one of said housing means and said frame.

10. A seat assembly as set forth in claim 8 wherein said biasing means includes a pair of springs, one of said springs being disposed about said shaft and interconnecting said casing and said first housing means for urging said first housing means to rotate about said shaft and the other of said springs being disposed about said shaft and interconnecting said member and said second housing means for urging said second housing means to rotate about said shaft.

References Cited

UNITED STATES PATENTS

| | | | |
|---|---|---|---|
| 2,684,708 | 7/1954 | Luketa | 297—330 |
| 2,701,606 | 2/1955 | Hascharn et al. | 296—410 X |
| 2,862,673 | 12/1958 | Smaltz | 242—54 |
| 2,985,229 | 5/1961 | Shanblin | 297—410 |
| 3,220,700 | 11/1965 | Comeau | 254—134.3 |

CASMIR A. NUNBERG, *Primary Examiner.*